(12) United States Patent
Luthra et al.

(10) Patent No.: US 10,618,848 B2
(45) Date of Patent: Apr. 14, 2020

(54) CERAMIC MATRIX COMPOSITES MADE BY CHEMICAL VAPOR INFILTRATION AND METHODS OF MANUFACTURE THEREOF

(71) Applicant: GENERAL ELECTRIC COMPANY, Schenectady, NY (US)

(72) Inventors: Krishan Lal Luthra, Schenectady, NY (US); Gregory Scot Corman, Ballston Lake, NY (US); Badri Narayan Ramamurthi, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 133 days.

(21) Appl. No.: 15/022,995

(22) PCT Filed: Aug. 28, 2014

(86) PCT No.: PCT/US2014/053034
§ 371 (c)(1),
(2) Date: Mar. 18, 2016

(87) PCT Pub. No.: WO2015/041823
PCT Pub. Date: Mar. 26, 2015

(65) Prior Publication Data
US 2016/0229755 A1 Aug. 11, 2016

Related U.S. Application Data

(60) Provisional application No. 61/880,352, filed on Sep. 20, 2013.

(51) Int. Cl.
*C04B 35/80* (2006.01)
*C04B 35/584* (2006.01)
(Continued)

(52) U.S. Cl.
CPC .......... *C04B 35/806* (2013.01); *C04B 35/565* (2013.01); *C04B 35/584* (2013.01);
(Continued)

(58) Field of Classification Search
CPC ................ C04B 35/806; C04B 35/565; C04B 35/58092; C04B 35/584; C04B 35/80;
(Continued)

(56) References Cited

U.S. PATENT DOCUMENTS 5,160,471 A 11/1992 Vives et al.
5,405,560 A 4/1995 Chareire et al.
(Continued)

FOREIGN PATENT DOCUMENTS

EP 1215183 A1 6/2002
JP 02503904 A 11/1990

OTHER PUBLICATIONS

International Search Report and Written Opinion dated Nov. 27, 2014 with was issused in connection with PCT Patent Application No. PCT/US2014/053034 which was filed on Aug. 28, 2014.
(Continued)

*Primary Examiner* — Stella K Yi
(74) *Attorney, Agent, or Firm* — Dority & Manning, P.A.

(57) ABSTRACT

The present disclosure relates to ceramic matrix composites made by chemical vapor infiltration, methods of making the ceramic matrix composites, and ceramic matrix composite turbine components for use in a hot gas pathway. A method of fabricating a ceramic matrix composite is provided that can include the steps of: (i) forming a plurality of holes in a ceramic matrix composite preform of desired shape; and (ii) densifying the preform by a chemical vapor infiltration process to form a part or most of the matrix. A ceramic matrix composite is also provided that can be used in hot combustion gases made according to the aforementioned
(Continued)

ceramic matrix composite fabrication method described herein.

16 Claims, 4 Drawing Sheets

(51) Int. Cl.
    *C04B 35/565*     (2006.01)
    *C04B 35/58*     (2006.01)

(52) U.S. Cl.
    CPC ........ *C04B 35/58092* (2013.01); *C04B 35/80* (2013.01); *C04B 2235/3804* (2013.01); *C04B 2235/3813* (2013.01); *C04B 2235/3817* (2013.01); *C04B 2235/3839* (2013.01); *C04B 2235/3843* (2013.01); *C04B 2235/483* (2013.01); *C04B 2235/5244* (2013.01); *C04B 2235/5248* (2013.01); *C04B 2235/5252* (2013.01); *C04B 2235/5256* (2013.01); *C04B 2235/614* (2013.01); *C04B 2235/94* (2013.01)

(58) Field of Classification Search
    CPC ............ C04B 38/0032; C04B 38/0003; C04B 2235/5244; C04B 35/571; C04B 35/62863; B29C 65/528; B29C 66/72325; B29C 67/242
See application file for complete search history.

(56) References Cited

U.S. PATENT DOCUMENTS

| | | |
|---|---|---|
| 5,490,892 A | 2/1996 | Castagnos et al. |
| 7,063,886 B2 | 6/2006 | Thebault et al. |
| 7,247,212 B2 | 7/2007 | Kostar et al. |
| 7,306,826 B2 | 12/2007 | Subramanian et al. |
| 7,549,840 B2 | 6/2009 | Subramanian et al. |
| 7,597,838 B2 | 10/2009 | Subramanian et al. |
| 7,754,126 B2 | 7/2010 | Subramanian et al. |
| 7,837,914 B2 | 11/2010 | Kostar et al. |
| 8,216,641 B2 | 7/2012 | Bouchard et al. |
| 8,357,323 B2 | 1/2013 | Morrison et al. |
| 2004/0221941 A1 | 11/2004 | Bouillon et al. |
| 2009/0110877 A1 | 4/2009 | Bernard et al. |
| 2009/0139808 A1* | 6/2009 | Bouchard ............ F16D 69/023 188/218 XL |

OTHER PUBLICATIONS

Machine Translation and Japanese Office Action Issued in connection with corresponding JP Application No. 2016544343 dated May 8, 2018.

* cited by examiner

CERAMIC MATRIX COMPOSITES MADE BY CHEMICAL VAPOR INFILTRATION AND METHODS OF MANUFACTURE THEREOF

CROSS-REFERENCE TO RELATED APPLICATIONS

This application is a national stage application under 35 U.S.C. § 371(c) of prior filed, PCT application serial number PCT/US2014/053034, filed on Aug. 28, 2014, which claims priority to U.S. Provisional Patent Application Ser. No. 61/880,352 of Luthra, et al. titled "Ceramic Matrix Composites Made by Chemical Vapor Infiltration and Methods of Manufacture Thereof" filed on Sep. 20, 2013; the disclosure of which is incorporated by reference herein.

BACKGROUND

The present disclosure relates to ceramic matrix composites made by chemical vapor infiltration, methods of making the ceramic matrix composites, and ceramic matrix composite turbine components for use in a hot gas pathway.

One of the key limitations of CVI composites is that the matrix can contain significant porosity. The porosity increases with thickness and can significantly impact both the in-plane and inter-laminar properties. Therefore, there is a need for improved methods and techniques in fabricating ceramic matrix composites for use in the manufacture of such items as turbine components used in a hot gas pathway.

The methods, ceramic matrix composites, ceramic matrix composite turbine components, and techniques of the present disclosure are directed to overcoming these and other deficiencies in the art.

BRIEF DESCRIPTION OF THE INVENTION

Aspects and advantages of the invention will be set forth in part in the following description, or may be obvious from the description, or may be learned through practice of the invention.

The present disclosure relates to, inter alia, ceramic matrix composites made by chemical vapor infiltration, methods of making the ceramic matrix composites, and ceramic matrix composite turbine components for use in a hot gas pathway.

In one aspect, the present disclosure provides a method of fabricating a ceramic matrix composite. In one embodiment, this method comprises the steps of: (i) forming a plurality of holes in a ceramic matrix composite preform of desired shape; and (ii) densifying the preform by a chemical vapor infiltration process to form a part or most of the matrix.

In another aspect, the present disclosure provides a ceramic matrix composite used in hot combustion gases made according to the aforementioned ceramic matrix composite fabrication method described herein.

In yet another aspect, the present disclosure provides a ceramic matrix composite turbine component for use in a hot gas pathway that comprises a ceramic matrix composite made according to the aforementioned ceramic matrix composite fabrication method described herein.

As provided herein, the methods, ceramic matrix composites, ceramic matrix composite turbine components, and techniques of the present disclosure are effective to solve the porosity problem associated with the use of CVI in fabricating ceramic matrix composites by, inter alia, creating thru thickness holes in the preform before CVI. In various embodiments of the method of the present disclosure, the holes can be created by machining or by using a polymer fiber which on burnout leaves behind holes. In various embodiments, the hole diameter is much larger than the pore size in the preform, which allows the gases during CVI to penetrate the entire thickness of the preform.

In one non-limiting example, the method of the present disclosure can involve making a preform, more particularly with a uniaxial tape layup or with a cloth layup. Holes can then be drilled before or after the binder burnout. Further, in some embodiments, the holes can be tapered with the larger diameter on the face of the preform. The CVI process can then be used to fill both the preform pores and the holes formed in the preform. Filling pores would increase inter-laminar properties and oxidation life. In various embodiments, SiC present in the large holes may further improve inter-laminar properties. In some cases, it may be desirable to pre-coat the inside surface of holes with BN. The properties can be tailored by providing holes only in the regions requiring dense composites.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

The subject matter which is regarded as the invention is particularly pointed out and distinctly claimed in the concluding part of the specification. The invention, however, may be best understood by reference to the following description taken in conjunction with the accompanying drawing figures in which:

Figure 1A:
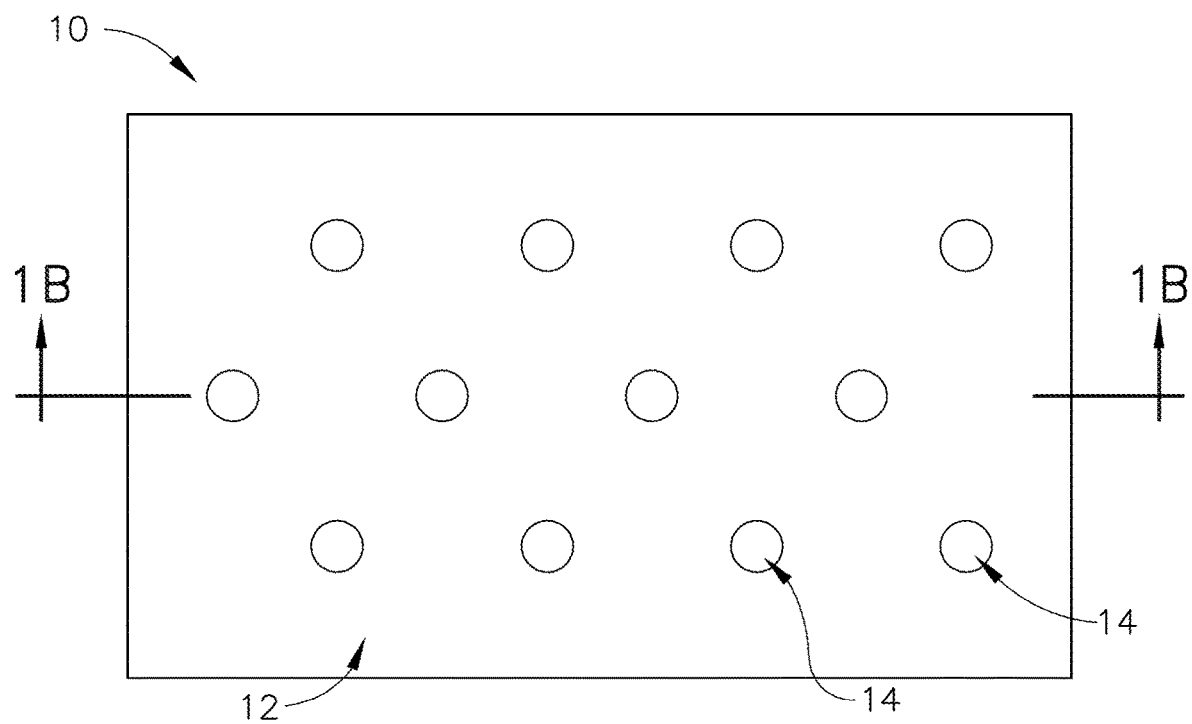
FIG. 1A is an illustration of one embodiment of a preform according to the present disclosure.

Repeat use of reference characters in the present specification and drawings is intended to represent the same or analogous features or elements of the present invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the methods, ceramic matrix composites, ceramic matrix composite turbine components, and techniques of the present disclosure address problems associated with making composites using a chemical vapor infiltration process.

In one aspect, the present disclosure provides a method of fabricating a ceramic matrix composite. In one embodiment, forming a plurality of holes in a ceramic matrix composite preform of desired shape having a first face and an opposing second face that define a thickness of the preform, and then densifying the preform by a chemical vapor infiltration (CVI) process to form a part or most of the matrix. For example, this method can comprise the steps of: (i) providing a ceramic matrix composite preform of desired shape having a first face and an opposing second face that define a thickness of the preform; (ii) forming a plurality of holes in the preform that extend partially and/or fully thru the thickness of the preform; and (iii) densifying the preform by a chemical vapor infiltration (CVI) process to form a part or most of the matrix.

In one embodiment, the matrix is a silicon-containing material. Suitable silicon-containing materials can include, without limitation silicon carbide, silicon nitride, molybdenum silicide, and mixtures thereof. In certain embodiments, the silicon-containing material comprises silicon as a predominant component. In a particular embodiment, the ceramic matrix composite is a silicon carbide-silicon carbide composite.

In one embodiment, the ceramic matrix composite is a continuous fiber reinforced composite. In certain embodiments, the fiber of the ceramic matrix composite can include, without limitation, carbon, silicon carbide, a silicon carbide-containing material, and mixtures thereof.

As provided herein, in a particular embodiment, the silicon-containing material comprises SiC. The SiC can be deposited using various techniques. According to one technique, the SiC can be deposited from methyl-trichlorosilane. According to another technique, the SiC can be deposited from a mixture or mixtures of silane or chloro-silane and a carbon-containing gas.

In one embodiment, the matrix further comprises a carbide or a boride. In another embodiment, the matrix further comprises HfC, ZrC, TiC, TiB2, $ZrB_2$, and/or $HfB_2$.

As provided herein, the method of the present disclosure involves providing a ceramic matrix composite preform of a desired shape having a first face and an opposing second face that define a thickness of the preform. In one embodiment, the first face and second face have surface structures and topographies that are either the same or different from one another. That is, the first face may be a parallel surface to the second face in one embodiment, or may by non-parallel to the second face in another embodiment (e.g., in a tapered relationship to each other).

As provided herein, the method of the present disclosure involves forming a plurality of holes in the preform, where the holes extend partially and/or fully thru the thickness of the preform. In one embodiment, the holes are either uniformly or non-uniformly distributed across the preform. FIG. 1A illustrates one embodiment of a preform 10 defining a first face 12 having holes 14 that are generally uniformly distributed across the first face 12. In various embodiments, the holes 14 can be present only in a part of the preform 10 or in multiple parts of the preform 10.

The holes 14 formed in the preform may have various local volume fractions. In one embodiment, the local volume fraction of the holes varies from between about 0.1% to about 30% over a surface region of the preform, or more particularly from about 2% to about 10% over a surface region of the preform.

The porosity of the preform that is provided according to the method of the present disclosure may vary. In one embodiment, the preform can have a porosity of between about 20% to about 80%. In a more particular embodiment, the preform can have a porosity of between about 40% to about 70%.

Figure 1B:
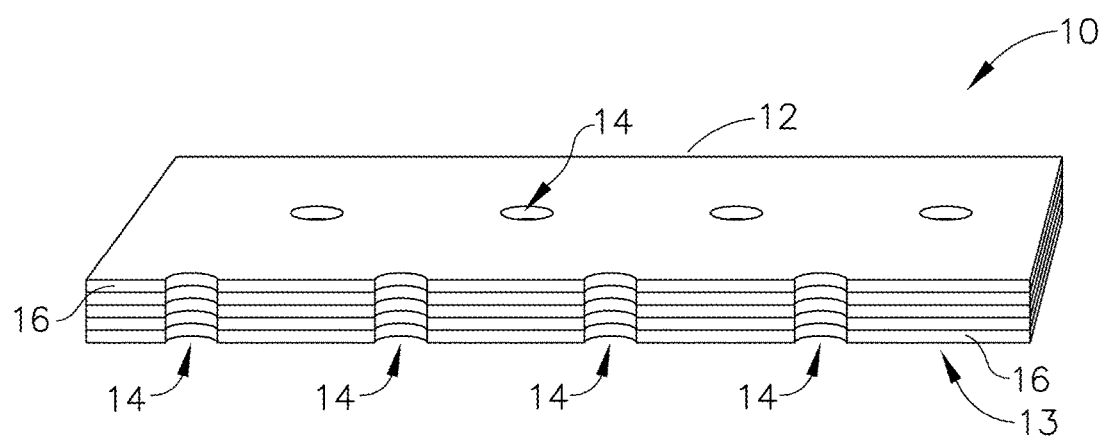
FIG. 1B shows a cross-sectional view of the embodiment shown in FIG. 1A.
Figure 2A:
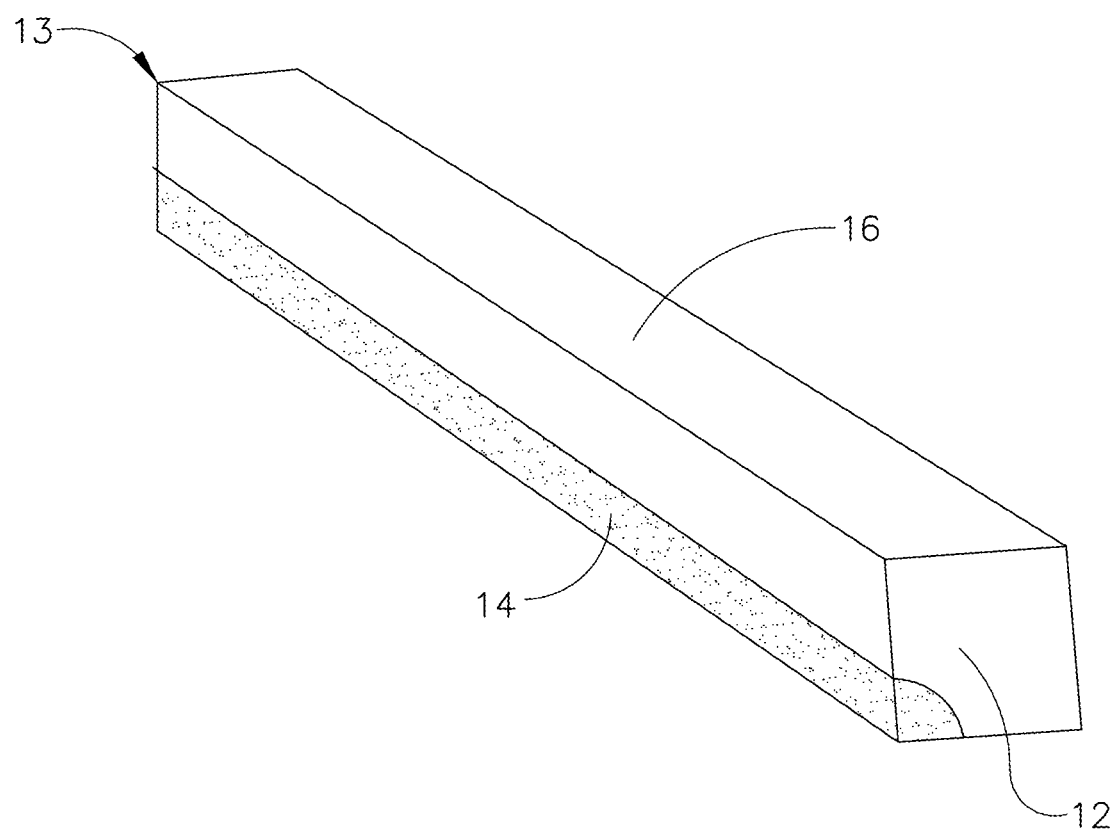
FIG. 2A is an illustration of an exemplary hole extending through a ply in the preform.

The preform provided according to the method of the present disclosure can also include fibers. In one embodiment, the preform comprises plies with unidirectional fibers. In another embodiment, the preform comprises plies with a 2-D woven architecture, with or without thru-thickness stitching. In a further embodiment, the preform comprises a 3 D fiber architecture made by weaving and/or braiding. FIG. 1B shows a plurality of plies 16 forming the preform 10, and FIG. 2A shows an exemplary ply 16 adjacent to a hole 14 extending from the first face 12 to the second, opposite face 13.

According to the method of the present disclosure, the volume fraction of the fibers can vary. In one embodiment, the volume fraction of the fibers is between about 10% to about 60%. In another embodiment, the volume fraction of the fibers is between about 15% to about 40%. In various other embodiments, the fibers used in the method of the present disclosure can have one or more layered coating.

According to the method of the present disclosure, the holes formed in the preform can be of various sizes, shapes, and depths. In one embodiment, the holes have a cross-dimensional diameter (i.e., the longest length measured in the hole's cross-direction) ranging from about 25 microns to about 250 microns. In another embodiment, the holes have a cross-dimensional diameter ranging from about 50 microns to about 200 microns. In a further embodiment, the holes have a cross-dimensional diameter ranging from about 75 microns to about 150 microns. In yet another embodiment, the holes have a cross-dimensional diameter ranging from about 90 microns to about 125 microns. Further, the present disclosure provides that the holes of the preform can be of uniform cross-dimensional diameter, or can vary in their cross-dimensional diameter. Further, different portions of the preform can have holes that are uniform in cross-dimensional diameter, or that vary in their cross-dimensional diameter.

The holes formed in the preform can be arranged in various volume fractions. In one embodiment, the volume fraction of the holes is between about 0.5% to about 15% for the entire preform. In another embodiment, the volume fraction of the holes is between about 3% to about 10% for the entire preform.

As provided herein, the holes formed in the preform can be of various depths into the preform. As described herein, the ceramic matrix composite preform provided in accordance with the method of the present disclosure has a desired shape and has a first face and an opposing second face that define a thickness of the preform. In one embodiment, the holes penetrate the full thickness of the preform. In another embodiment, the holes penetrate part of the thickness. In a further embodiment, the holes can be of the same or different cross-sectional shape. In a particular embodiment, the holes have a cross-sectional shape that can include, without limitation, a circle, square, rectangle, oval, and any other two-dimensional closed pattern.

In one embodiment, the holes formed in the preform can have a constant cross-sectional dimension through the preform. In another embodiment, the holes can vary in cross-sectional dimension through the preform. In various embodiments, the holes formed in the preform can be tapered. In a particular embodiment, the diameter of the tapered holes is larger at a face of the preform. In other embodiments, the tapered holes extend through the thickness of the preform so that the diameter of the holes on one face is larger than the diameter of the holes on the opposing face of the preform.

In certain embodiments, the holes formed in the preform can be perpendicular and/or at an angle to a face of the preform. In certain other embodiments, the holes are formed into and extend inwardly from the first face of the preform, formed into and extend inwardly from the second face of the preform, or formed into and extend inwardly from both the first and second faces of the preform.

In accordance with the method of the present disclosure, various techniques can be used to form the holes in the preform. Suitable techniques for forming the holes in the preform can include, without limitation, mechanical drilling, laser drilling, electrical discharge machining (EDM), water jet machining, ultrasonic abrasive machining, and/or through the use of a fugitive fiber or rod.

As provided herein, the method of fabricating a ceramic matrix composite involves the step of providing a ceramic matrix composite preform of a desired shape. In a particular embodiment, the desired shape of the ceramic matrix composite preform is of a turbine component for use in a hot gas pathway. In more particular embodiments, the turbine component can include, without limitation, combustion liners, vanes and blades, nozzles, buckets, transition pieces, turbine center frames, and shrouds.

As set forth herein, the present disclosure provides a method of fabricating a ceramic matrix composite that involves providing a ceramic matrix composite preform of desired shape having a first face and an opposing second face that define a thickness of the preform. The method also involves forming a plurality of holes in the preform that extend partially and/or fully thru the thickness of the preform.

In one embodiment, after forming the holes in the preform, the method involves densifying the preform by a chemical vapor infiltration (CVI) process to form a part or most of the matrix. The use of CVI in forming ceramic matrix composites is known by those of ordinary skill in the art. Nonlimiting examples of the use of CVI in forming ceramic matrix composites, including SiC/SiC ceramic matrix composites, are described in various patents, including, without limitation, in U.S. Pat. Nos. 7,306,826, 7,754,126, 7,837,914, and 8,114,799, the entire disclosures of which are hereby incorporated by reference. As provided herein, one suitable method of using CVI to form CMCs can involve the use of fugitive fibers. Nonlimiting examples of the use of fugitive fibers in forming CMCs (e.g., using fugitive fibers to form SiC/SiC CMCs) are described in various patents, including, without limitation, in U.S. Pat. Nos. 7,754,126 and 7,549,840, the entire disclosures of which are hereby incorporated by reference. In another embodiment, the method of the present disclosure involves using 2D preforms. Nonlimiting examples of the use of 2D preforms in a CVI process for forming ceramic matrix composites (including SiC/SiC CMCs) are described in various patents, including, without limitation, in U.S. Pat. No. 7,597,838, the disclosure of which is hereby incorporated by reference.

As provided herein, in a particular embodiment, the method of the present disclosure involves fabricating a ceramic matrix composite by using a ceramic matrix composite preform of a turbine component, including, without limitation, turbine components for use in a hot gas pathway (e.g., combustion liners, vanes and blades, nozzles, buckets, transition pieces, turbine center frames, and shrouds). Nonlimiting examples of turbine engine components made from a ceramic matrix composite are described in various patents, including, without limitation, in U.S. Pat. No. 7,247,212, the entire disclosure of which is hereby incorporated by reference. In one particular embodiment, as described in U.S. Pat. No. 7,247,212, the method of the present disclosure can be used to make a turbine engine component made from a CMC by weaving a three-dimensional composite preform that provides a tailored fiber architecture that may be assembled near-net-shape.

In another aspect, the present disclosure provides a ceramic matrix composite used in hot combustion gases made according to the aforementioned ceramic matrix composite fabrication method described herein.

In yet another aspect, the present disclosure provides a ceramic matrix composite turbine component for use in a hot gas pathway that comprises a ceramic matrix composite made according to the aforementioned ceramic matrix composite fabrication method described herein. As provided herein, the turbine component can include, without limitation, combustion liners, vanes and blades, nozzles, buckets, transition pieces, turbine center frames, and shrouds. In particular embodiments, the turbine component is integrated as part of an industrial gas turbine or an aircraft engine.

While the invention has been described in terms of one or more particular embodiments, it is apparent that other forms could be adopted by one skilled in the art. It is to be understood that the use of "comprising" in conjunction with the coating compositions described herein specifically discloses and includes the embodiments wherein the coating compositions "consist essentially of" the named components (i.e., contain the named components and no other components that significantly adversely affect the basic and novel features disclosed), and embodiments wherein the coating compositions "consist of" the named components (i.e., contain only the named components except for contaminants which are naturally and inevitably present in each of the named components).

EXAMPLES

The following examples are intended to illustrate particular embodiments, but are by no means intended to limit the scope of the present systems and techniques.

Example 1: Effect of Pin Hole on Densification

The effect of using pin holes on densification have been modeled in the context of using preforms with holes in a CVI process. The assumptions in these calculations were: a fiber fill fraction of 35% and pore diameters of about 6 to about 10 microns. Table 1 shows the pin hole volume fraction (in %) to the pin hole spacing (center-to-center, in mils) for four different exemplary preforms that were modeled with pin hole diameters of 2 mils (about 50.8 μm):

TABLE 1

| Pin Hole Vol. Fraction (%) | C-to-C Pin Hole Spacing |
|---|---|
| 1 | 17.7 mils (about 450 μm) |
| 2 | 12.5 mils (about 317.5 μm) |
| 5 | 7.9 mils (about 200.66 μm) |
| 10 | 5.6 mils (about 142.25 μm) |

Figure 2B:
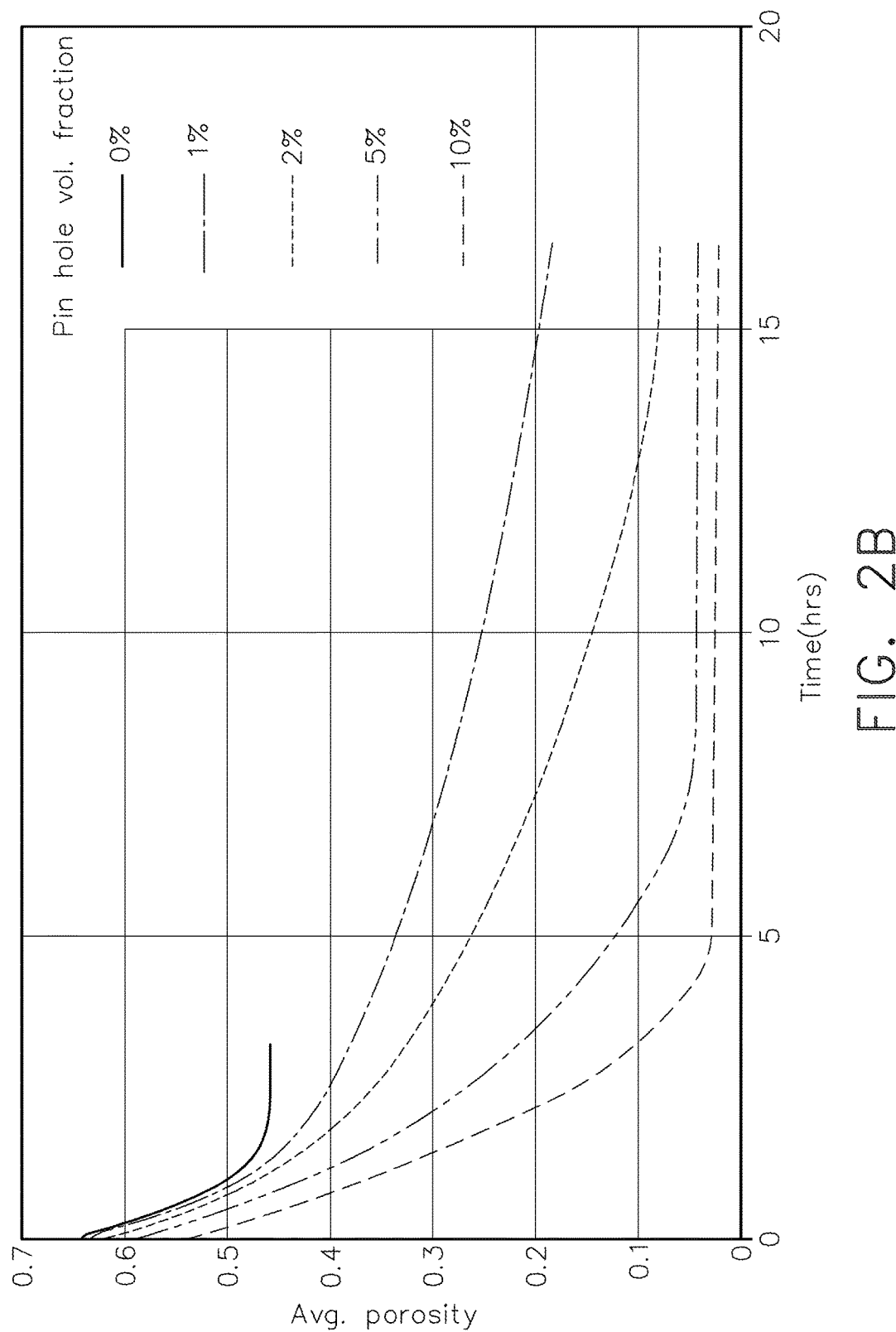
FIG. 2B is a graph showing the effect of the use of holes in a preform on densification.

FIG. 2B illustrates how pin hole volume fraction affects average porosity over time.

Example 2: Comparison of CMC Preforms with Holes Against Prior Disclosures

Figure 3:
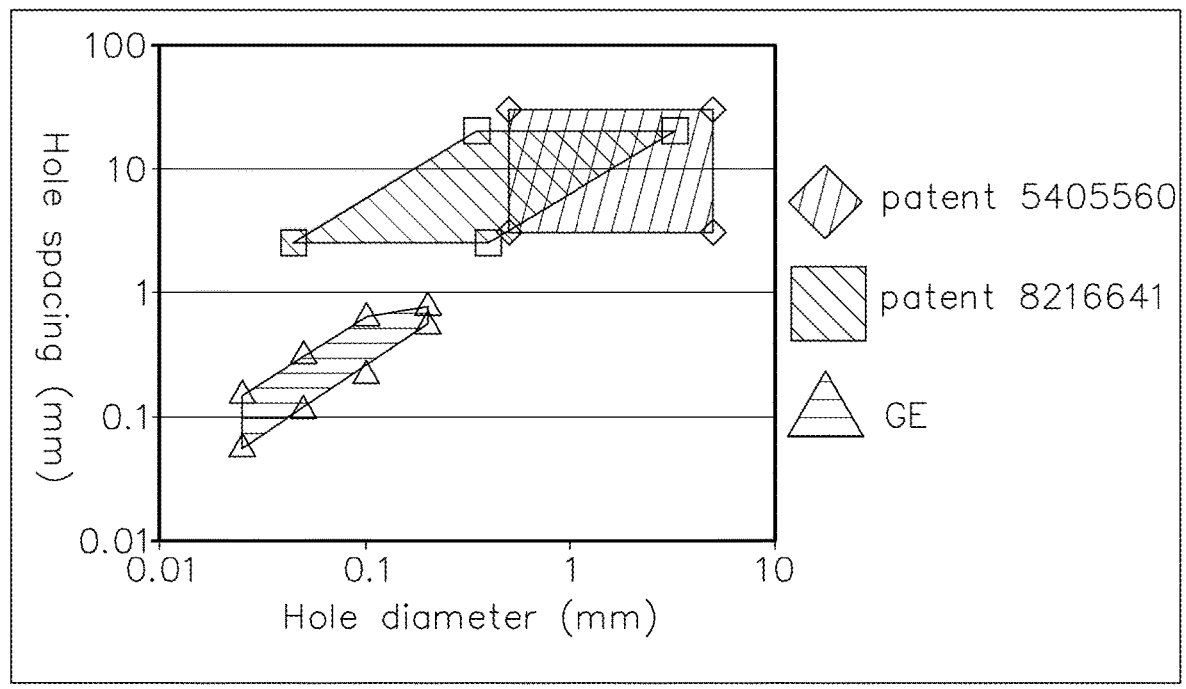
FIG. 3 is a graph comparing preform hole spacing (mm) and hole diameter (mm) of embodiments of the present disclosure with those described in U.S. Pat. Nos. 5,405,560 and 8,216,641.
Figure 4:
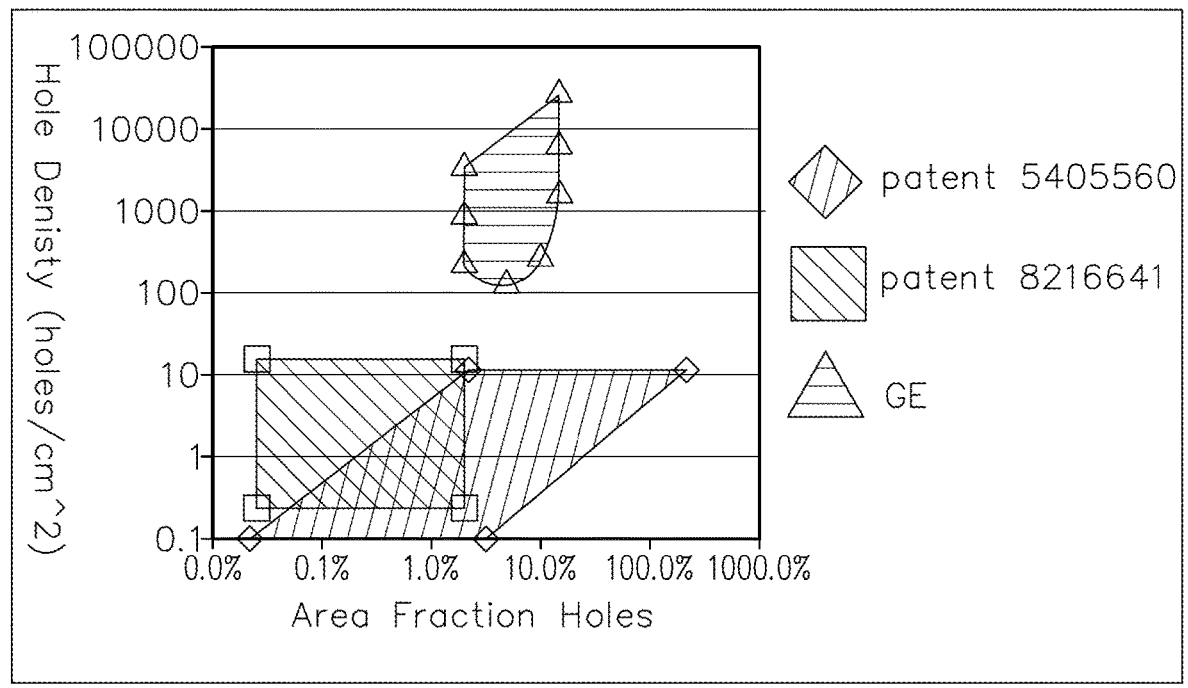
FIG. 4 is a graph comparing preform hole density (holes/$cm^2$) and area fraction (%) of embodiments of the present disclosure with those described in U.S. Pat. Nos. 5,405,560 and 8,216,641.

Various embodiments of ceramic matrix composite preforms containing holes according to the present disclosure have been compared against preforms of prior disclosures. FIG. 3 is a graph comparing preform hole spacing (mm) and hole diameter (mm) of embodiments of the present disclosure with those described in U.S. Pat. Nos. 5,405,560 and 8,216,641. FIG. 4 is a graph comparing preform hole density (holes/cm$^2$) and area fraction (%) of embodiments of the present disclosure with those described in U.S. Pat. Nos. 5,405,560 and 8,216,641.

As illustrated in FIG. 3 and FIG. 4, the CMC preforms of the embodiments of the present disclosure are distinguishable from the preforms of the prior disclosures of U.S. Pat. Nos. 5,405,560 and 8,216,641.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of fabricating a silicon carbide-containing ceramic matrix composite including a matrix therein, said method comprising:
    forming a plurality of holes in a ceramic matrix composite preform of desired shape, wherein the ceramic matrix composite preform has a first face and an opposing second face that define a thickness of the preform, wherein the holes are formed by laser drilling, electrical discharge machining (EDM), water jet machining, or ultrasonic abrasive machining, wherein the ceramic matrix composite preform has a local volume fraction of the plurality of the holes that varies from about 0.1% to about 30% over a surface region of the ceramic matrix composite preform, wherein the matrix is a silicon-containing material selected from the group consisting of silicon carbide, silicon nitride, molybdenum silicide, and mixtures thereof; and
    densifying the ceramic matrix composite preform by a chemical vapor infiltration process using silicon to form a part or most of the matrix such that SiC forms within the plurality of holes, wherein the holes of the plurality of holes vary in cross-sectional dimension through the preform.

2. A method of fabricating a silicon carbide-containing ceramic matrix composite including a matrix therein, said method comprising:
    forming a plurality of holes in a ceramic matrix composite preform of desired shape, wherein the ceramic matrix composite preform has a first face and an opposing second face that define a thickness of the preform, wherein the holes are formed by laser drilling, electrical discharge machining (EDM), water jet machining, or ultrasonic abrasive machining, wherein the preform has a porosity of between about 20% to about 80%; and
    densifying the preform by a chemical vapor infiltration process using silicon to form a part or most of the matrix such that SiC forms within the plurality of holes.

3. The method according to claim 1, wherein the preform comprises plies with unidirectional fibers; or plies with a 2-D woven architecture, with or without thru-thickness stitching; or a 3-D fiber architecture made by weaving and/or braiding.

4. The method according to claim 1, wherein the plurality of holes have a cross-dimensional diameter ranging from about 25 microns to about 250 microns.

5. A method of fabricating a silicon carbide-containing ceramic matrix composite including a matrix therein, said method comprising:
    forming a plurality of holes in a ceramic matrix composite preform of desired shape, wherein the ceramic matrix composite preform has a first face and an opposing second face that define a thickness of the preform, wherein the holes are formed by laser drilling, electrical discharge machining (EDM), water jet machining, or ultrasonic abrasive machining, wherein the ceramic matrix composite preform has a volume fraction of the plurality of holes that is between about 0.5% to about 15% for the entire preform, wherein the matrix is a silicon-containing material selected from the group consisting of silicon carbide, silicon nitride, molybdenum silicide, and mixtures thereof; and
    densifying the preform by a chemical vapor infiltration process using silicon to form a part or most of the matrix such that SiC forms within the plurality of holes, wherein the holes of the plurality of the holes vary in cross-sectional dimension through the preform.

6. The method according to claim 1, wherein the holes of the plurality of the holes penetrate the full thickness.

7. The method according to claim 1, wherein the holes of the plurality of the holes have a cross-sectional shape selected from the group consisting of a circle, square, rectangle, oval, and any other two-dimensional closed pattern.

8. The method according to claim 1, wherein the holes of the plurality of the holes are tapered.

9. The method according to claim 1, wherein the ceramic matrix composite is a silicon carbide-silicon carbide composite or a continuous fiber reinforced composite.

10. A ceramic matrix composite formed according to the method of claim 1.

11. The method according to claim 1, wherein the local volume fraction of the plurality of holes varies from about 2% to about 10% over a surface region of the preform.

12. The method according to claim 2, wherein the preform has a porosity of between about 40% to about 70%.

13. The method according to claim 5, wherein the volume fraction of the plurality of holes is between about 3% to about 10% for the entire preform.

14. The method according to claim 1, further comprising:
    prior to forming the plurality of holes, forming the ceramic matrix composite preform via a uniaxial tape layup or with a cloth layup.

15. The method according to claim 1, further comprising:
prior to forming the plurality of holes, heating the ceramic matrix composite preform to cause binder burnout therein.

16. A method of fabricating a silicon carbide-containing ceramic matrix composite including a matrix therein, said method comprising:
forming a plurality of holes in a ceramic matrix composite preform of desired shape, wherein the ceramic matrix composite preform has a first face and an opposing second face that define a thickness of the preform, wherein the holes are formed by laser drilling, electrical discharge machining (EDM), water jet machining, or ultrasonic abrasive machining;
coating an inside surface of the plurality of holes with BN; and
thereafter, densifying the preform by a chemical vapor infiltration process using silicon to form a part or most of the matrix such that SiC forms within the plurality of holes.

* * * * *